US011913891B2

United States Patent
Ito

(10) Patent No.: US 11,913,891 B2
(45) Date of Patent: Feb. 27, 2024

(54) STRUCTURE FOR PRESSURIZATION ANALYSIS, X-RAY DIFFRACTION APPARATUS AND PRESSURIZATION ANALYSIS SYSTEM

(71) Applicant: RIGAKU CORPORATION, Akishima (JP)

(72) Inventor: Koichiro Ito, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 292 days.

(21) Appl. No.: 17/482,591

(22) Filed: Sep. 23, 2021

(65) Prior Publication Data

US 2022/0099603 A1 Mar. 31, 2022

(30) Foreign Application Priority Data

Sep. 28, 2020 (JP) ................................ 2020-162284

(51) Int. Cl.
*H01M 10/05* (2010.01)
*H01M 10/48* (2006.01)
(Continued)

(52) U.S. Cl.
CPC ... *G01N 23/20041* (2013.01); *G01N 23/2055* (2013.01); *H01M 10/0562* (2013.01); *H01M 10/48* (2013.01); *G01N 23/20033* (2013.01); *G01N 2223/056* (2013.01); *G01N 2223/1016* (2013.01); *G01N 2223/307* (2013.01); *G01N 2223/3106* (2013.01); *G01N 2223/317* (2013.01); *Y02E 60/10* (2013.01)

(58) Field of Classification Search
CPC ......... G01N 23/2033; G01N 23/20041; G01N 23/2055; G01N 2223/1016; G01N 2223/307; G01N 2223/3106; G01N 2223/317; H01M 10/0562; H01M 10/48; Y02E 60/10

See application file for complete search history.

(56) References Cited

U.S. PATENT DOCUMENTS

2002/0192121 A1  12/2002  Gural et al.

FOREIGN PATENT DOCUMENTS

CN  110806419 A  2/2020
JP  9-166528 A  6/1997
(Continued)

OTHER PUBLICATIONS

Extended European Search Report dated Feb. 25, 2022, issued in counterpart EP application No. 21198405.9. (11 pages).
(Continued)

*Primary Examiner* — Mark R Gaworecki
(74) *Attorney, Agent, or Firm* — WHDA, LLP

(57) ABSTRACT

A structure for pressurization analysis includes a sample accommodating unit (10) for accommodating an all-solid-state battery (S) therein, and a pressurizing unit (30) having a pressurizing mechanism for causing pressure to act on the all-solid-state battery (S). The all-solid-state battery (S) is pressurized inside the sample accommodating unit (10) while being sandwiched between a pressure receiving member (21) and a pressing member (22). Further, an X-ray window (14) is provided in an outer radial direction orthogonal to an acting direction of the pressure from the pressurizing unit (30), and reflection type X-ray diffraction measurement can be performed through the X-ray window (14).

12 Claims, 12 Drawing Sheets

(51) Int. Cl.
  *G01N 23/20*      (2018.01)
  *G01N 23/20041*   (2018.01)
  *H01M 10/0562*    (2010.01)
  *G01N 23/2055*    (2018.01)
  *G01N 23/20033*   (2018.01)

(56) References Cited

FOREIGN PATENT DOCUMENTS

| JP | 2004-22206 A | 1/2004 |
|---|---|---|
| JP | 2012-159311 A | 8/2012 |
| JP | 2017-72530 A | 4/2017 |

OTHER PUBLICATIONS

Lemarié Quentin et al., "Sulfur-Based Electrode Using a Polyelectrolyte Binder Studied via Coupled in Situ Synchrotron X-ray Diffraction and Tomography", ACS Applied Energy Materials, Mar. 23, 2020, vol. 3, pp. 2422-2431; Cited in Extended European Search Report dated Feb. 25, 2022. (10 pages).

Tardif Samuel, et al., "Operando Raman Spectroscopy and Synchrotron X-ray Diffraction of Lithiation/Delithiation in Silicon Nanoparticle Anodes", ACS Nano, Nov. 9, 2017, vol. 11, pp. 11306-11316; Cited in Extended European Search Report dated Feb. 25, 2022. (11 pages).

Sun Fu et al., "Visualizing the morphological and compositional evolution of the interface of InLi-anode|thio-LISION electrolyte in an all-solid-state Li—S cell by in operando synchrotron X-ray tomography and energy dispersive diffraction", Journal of Materials Chemistry A, Nov. 20, 2018, vol. 6, pp. 22489-22496; Cited in Extended European Search Report dated Feb. 25, 2022. (8 pages).

Office Action dated Mar. 30, 2023, issued in counterpart EP Application No. 21198405.9. (5 pages).

G N Chesnut, et al., "Diamond-anvil cell for radial x-ray diffraction", Journal of Physics: Condensed Matter, vol. 18, Jun. 28, 2006, pp. S1083-S1090; Cited in EP Office Action dated Mar. 30, 2023. (8 pages).

Office Action dated Sep. 22, 2023, issued in counterpart JP Application No. 2020-162284 with English machine translation. (11 pages).

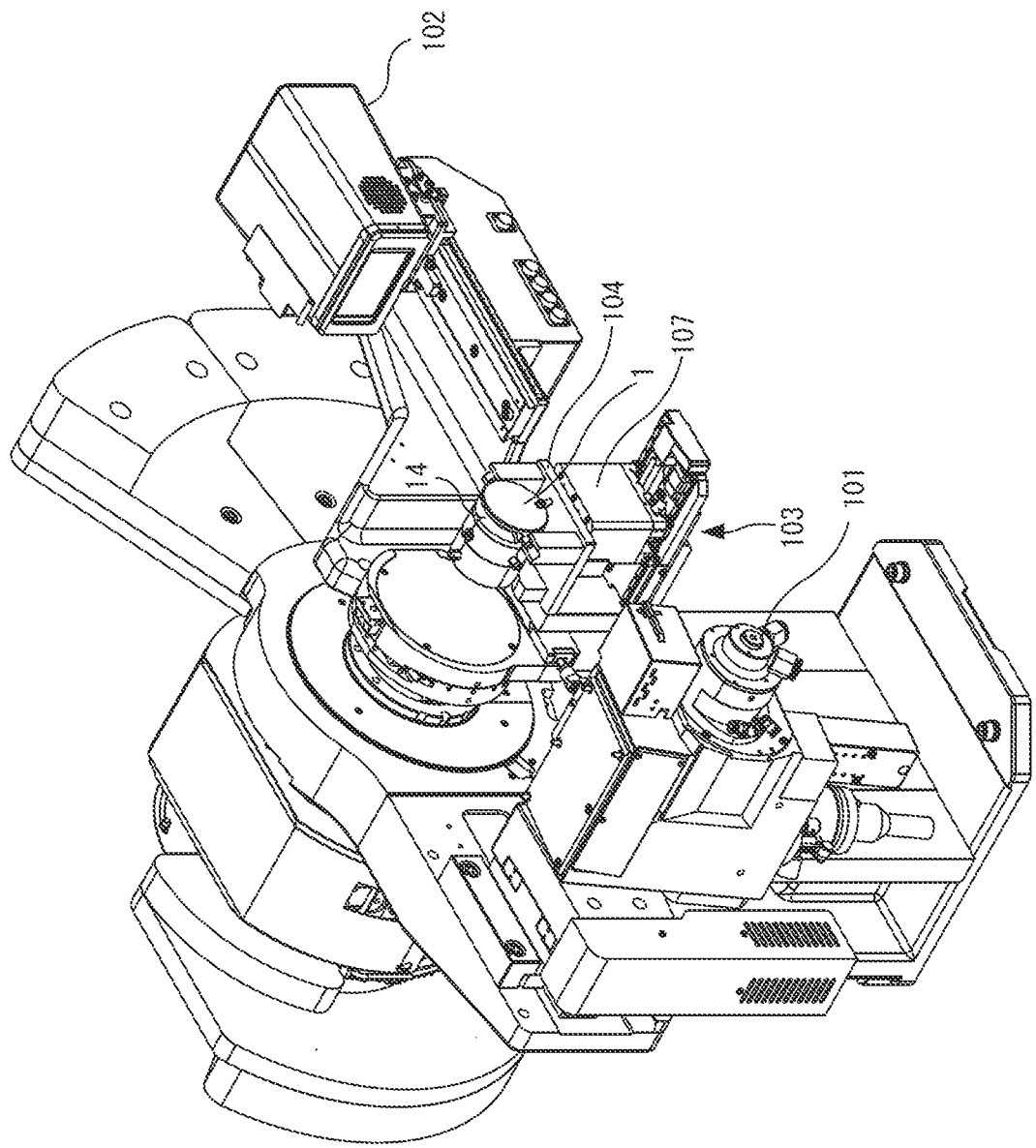

STRUCTURE FOR PRESSURIZATION ANALYSIS, X-RAY DIFFRACTION APPARATUS AND PRESSURIZATION ANALYSIS SYSTEM

FIELD OF THE INVENTION

The present invention relates to a structure for pressurization analysis, an X-ray diffraction apparatus and a pressurization analysis system that are used for analysis and evaluation of a sample under pressurization, and are particularly suitable for analysis and evaluation of an all-solid-state battery.

BACKGROUND OF THE INVENTION

An all-solid-state battery is configured to have electrode active material layers on both end sides of an electrolyte layer, which causes capacity deterioration and resistance increase during a charging and discharging cycle. For example, in an all-solid-state lithium-ion battery, the crystal structure is likely to change with insertion and removal of lithium ions (Li). Therefore, in order to elucidate the deterioration mechanism, changes in the crystal structure due to charging and discharging are evaluated by X-ray diffraction measurement.

Japanese Patent Laid-Open No. 2012-159311 (hereinafter referred to as Patent Literature 1) and Japanese Patent Laid-Open No. 2017-72530 (hereinafter referred to as Patent Literature 2) disclose conventional structures for battery analysis (structures for pressurization analysis) which are used for evaluation of sample batteries by X-ray diffraction measurement.

A battery structure for X-ray measurement disclosed in Patent Literature 1 is configured so that a battery element (2) is interposed between a negative electrode side cover (5a) and a positive electrode side cover (5b), and these covers (5a, 5b) are tightened by using many nuts (22) to hermetically seal the battery element (2), thereby shielding the battery structure for X-ray measurement from the atmosphere. Here, the tightening structure using the nuts (22) is used to ensure the airtightness of the battery element (2) (see paragraph "0020" in the specification of Patent Literature 1).

Further, an analysis cell disclosed in Patent Literature 2 is configured to include a housing (10) having a first member (11), a second member (21), and a third member (31), and accommodate a sample battery (100) in the housing (10) to perform evaluation by X-ray diffraction measurement. The respective members (11, 21, 31) constituting the housing (10) are assembled by inserting bolts into a large number of through-holes (12, 22, 32) formed in the respective members and tightening the bolts with nuts (see paragraph "0053" in the specification of Patent Literature 2).

Here, reference numerals in parentheses are those assigned to the respective components in each Patent Literature (hereinafter, the same applies).

In all-solid-state batteries, a solid electrolyte is used for an electrolyte layer. Inside the all-solid-state battery, an electrode active material layer, a solid electrolyte layer, a conductive material, etc. which are components of the all-solid-state battery expand and contract due to charging and discharging, and phenomena such as voids between particles, exfoliation of the interface between the solid electrolyte layer and the electrode active material layer or internal cracks are likely to occur, and if these phenomena occur, the battery would not function normally. Therefore, when analysis and evaluation are performed on this type of all-solid-state battery as a sample battery, it is necessary to hold the sample battery in a uniform pressurized state so that a conductive path is secured and expansion and contraction caused by charging and discharging are suppressed.

However, all of the conventional structures for battery analysis (analysis cells) disclosed in Patent Literatures 1 and 2 described above do not have any configuration for holding sample batteries in a uniform pressurized state to secure a conductive path and suppress the expansion and contraction of the sample batteries caused by charging and discharging.

Incidentally, the tightening structure using the nuts (22) disclosed in Patent Literature 1 is used to ensure the airtightness of the battery element (2), and also elastic members (4a, 4b) are interposed, so that it is impossible to uniformly apply a large pressure to the sample battery to the extent that the conductive path can be secured and the expansion and contraction can be suppressed even when the nuts (22) are tightened.

Further, Patent Literature 2 discloses a pressurizing mechanism (46) including a pushing rod, and the pressurizing mechanism (46) is used to protrude, from a window portion (13) of the housing (10), an electrode active material (112), the sample electrode (110) and a part of a window member (51) which are components of a sample battery (see paragraph "0042" in the specification and FIG. 3 of Patent Literature 2).

By protruding the electrode active material (112), the sample electrode (110), and the part of the window member (51) from the window portion (13) of the housing (10) as described above, the peripheries of the electrode active material (112) and the sample electrode (110) are covered by the window member (51) to prevent an electrolytic solution from infiltrating in between the sample electrode (110) and the window member (51) and improve the airtightness of the sample battery (see paragraph "0054" in the specification of Patent Literature 2).

However, the pressurizing mechanism (46) of Patent Literature 2 is configured so that a member for receiving the pressing force of the pushing rod is not arranged on a side facing the pushing rod, and thus the window member (51) receives the pressing force while being stretched. Therefore, it is impossible for even the pressurizing mechanism (46) to uniformly apply a large pressure to the sample battery to the extent that the conductive path can be secured and the expansion and contraction can be suppressed.

SUMMARY OF THE INVENTION

The present invention has been made in view of the above-described circumstances, and has an object to implement analysis and evaluation under a state where a sample is uniformly pressurized with a large pressure.

The present invention is not limited to analysis of an all-solid-state battery, and can be applied to analysis and evaluation of various types of samples under a pressurized state.

A structure for pressurization analysis according to the present invention comprises: a sample accommodating unit in which a sample chamber for accommodating and placing a sample therein is formed; and a pressurizing unit that is mounted on the sample accommodating unit and includes a pressurizing mechanism for causing pressure to act on the sample in the sample chamber. The sample accommodating unit includes a pressure receiving portion for receiving pressure from the pressurizing unit at a position opposite to the pressurizing unit with respect to the sample in the sample chamber, and an X-ray window provided in a direction intersecting an acting direction of the pressure from the pressurizing unit. The sample accommodating unit is configured to receive X-rays through the X-ray window to irradiate the sample in the sample chamber with the X-rays, and emit diffracted X-rays reflected from the sample to an outside of the sample accommodating unit from the X-ray window.

Here, the sample accommodating unit may include a bottomed cylindrical accommodating unit main body having opened one end surface and may be configured so that the sample chamber is formed inside the accommodating unit main body, and the pressure receiving portion receives the pressure of the pressurizing unit in a direction from an opened one end surface side of the accommodating unit main body to the sample in the sample chamber, and is formed at an inner bottom portion opposite to the opened one end surface.

Further, the X-ray window may be provided to face an outer peripheral surface of the accommodating unit main body, and the X-ray window may be blocked by a hermetically sealing member formed of a material through which X-rays are transmitted.

Further, the structure for pressurization analysis may be configured so that a stepped cutout groove is formed so as to penetrate from the outer peripheral surface of the accommodating unit main body to an inside of the accommodating unit main body, the stepped cutout groove may be configured so that an opening width of a space extending from a step portion of the cutout groove to the outer peripheral surface is larger than an opening width of a space extending from, the step portion to the inside, and the X-ray window may be provided at the step portion.

The sample accommodating unit may be configured to include a temperature adjusting member for adjusting the temperature of the sample placed in the sample chamber, and a temperature measuring member for measuring the temperature of the sample.

Further, the structure for pressurization analysis according to the present invention may be configured as follows by applying a sample including a plurality of laminated components in the axial direction as an analysis target.

The structure for pressurization analysis may further comprise a sample holder to be fitted and mounted in the sample accommodating unit, and the sample holder accommodates the sample therein, and is provided with a cutout portion through which an outer peripheral surface of the sample for enabling observation of a lamination state of the plurality of components of the sample is exposed to the X-ray window.

Here, the structure for pressurization analysis preferably further comprises a pressure receiving member that is provided in the sample chamber and configured so that one end surface thereof is in contact with one end surface of the sample placed in a sample placing portion, and the other end surface thereof is in contact with the pressure receiving portion.

When the sample is an all-solid-state battery including an electrolyte layer, electrode active material layers arranged at both end sides of the electrolyte layer, and current collector layers arranged outside the electrode active material layers respectively, it is preferable that the structure for pressurization analysis according to the present invention adopts the following configuration.

The structure for pressurization analysis is configured to further comprise a first electrode terminal in electrical communication with one of the current collector layers, and a second electrode terminal in electrical communication with the other current collector layer.

Here, the first electrode terminal may be provided outside the sample accommodating unit, the sample accommodating unit may include a component having electrical conductivity, and the one current collector layer and the first electrode terminal may be in electrical communication with each other via the component having electrical conductivity.

Further, the pressurizing mechanism may be formed of a metal member having electrical conductivity, and the other current collector layer and the second electrode terminal may be in electrical communication with each other via the pressurizing mechanism.

Next, an X-ray diffraction apparatus according to the present invention comprises: the structure for pressurization analysis having the above-described configuration; a sample stage for arranging the structure for pressurization analysis thereon; an X-ray source for applying X-rays to a sample in the sample chamber; and an X-ray detector for detecting diffracted X-rays reflected from the sample.

The sample stage is configured to include a support portion for supporting the structure for pressurization analysis so that a measurement reference plane including a central axis of the sample in the sample chamber and an axis orthogonal to the central axis is arranged horizontally, and a movement adjusting mechanism, for positioning the sample in the sample chamber to an X-ray irradiation position of X-rays from the X-ray source in a state where the measurement reference plane is arranged horizontally.

Here, the support portion may include a first support portion for supporting an airtight case unit mounted on an end surface side of the pressurizing unit to hermetically seal the periphery of the end surface side of the pressurizing unit and a second support portion for supporting the sample accommodating unit, and may be configured so that the central axis of the sample in the sample chamber is arranged horizontally by the first and second support portions, and the axis orthogonal to the central axis of the sample is arranged horizontally by the second support portion.

Next, a pressurization analysis system according to the present invention comprises: the X-ray diffraction apparatus having the above-described configuration; an airtight device for accommodating the structure for pressurization analysis therein to shield the structure for pressurization analysis from an atmosphere; and a measuring device for measuring pressure and electrochemical characteristics of the sample accommodated in the structure for pressurization analysis outside the airtight device.

BRIEF DESCRIPTION OF THE DRAWINGS

FIG. 9 is a perspective view showing the appearance of an X-ray diffraction apparatus according to the embodiment of the present invention;

DETAILED DESCRIPTION OF EMBODIMENTS

Figure 1:
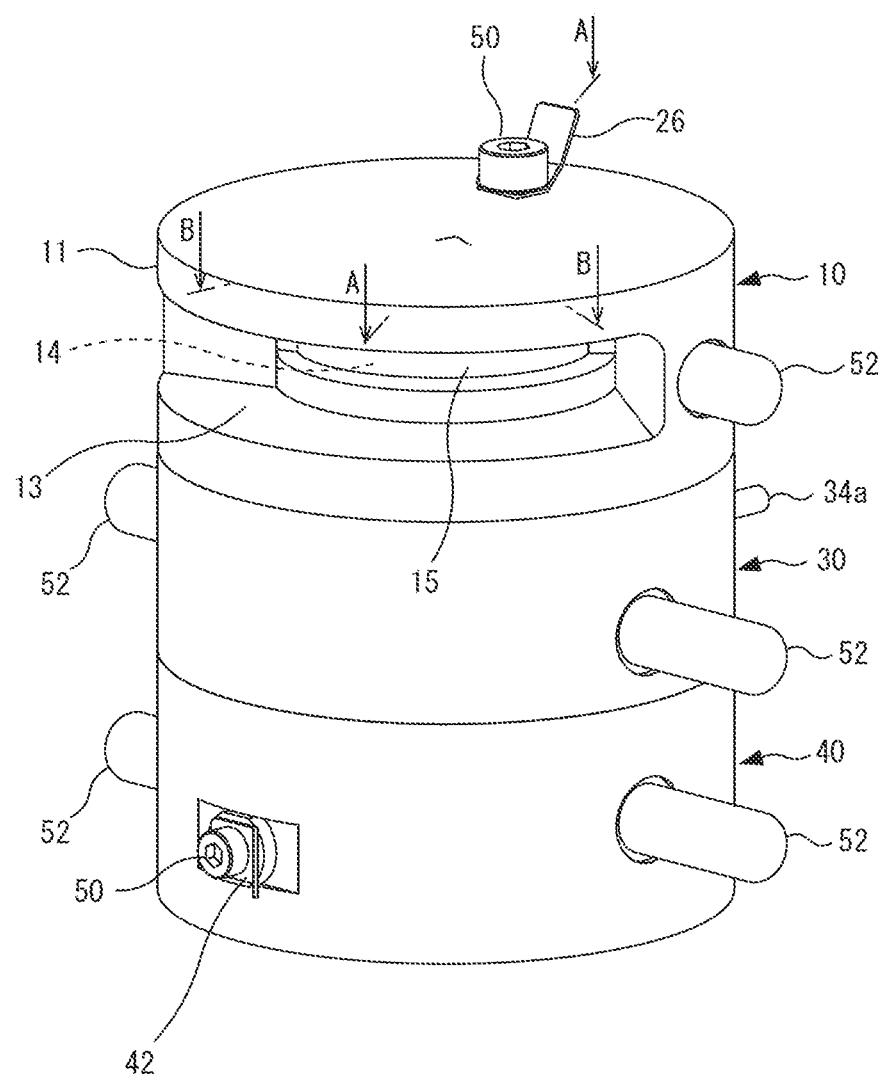
FIG. 1 is a perspective view showing the appearance of a structure for pressurization analysis (hereinafter referred to as "pressurization analysis structure") according to an embodiment of the present invention.

Hereinafter, embodiments of the present invention will be described in detail with reference to the drawings.

The present embodiment shows a configuration when a sample as an analysis target is an all-solid-state battery. The all-solid-state battery is configured so that electrode active material layers are arranged on both end sides of an electrolyte layer, and a current collector layer is arranged outside each of the electrode active material layers.

The all-solid-state battery as a sample in this embodiment is processed to have a cylindrical shape, and is analyzed while pressurized in an axial direction thereof. The all-solid-state battery as a sample may be processed to have another shape such as a block-like shape as well as a cylindrical shape. Regardless of the shape, the all-solid-state battery is configured so that the respective layers of the components are laminated in a pressure applying direction (pressurization direction), and each of the layers can be measured from an outer surface (specifically, an outer side surface or an outer peripheral surface).

In conventional batteries such as lithium-ion batteries, a liquid electrolyte has been used for the electrolyte layer. However, in all-solid-state batteries which have been increasingly developed in recent years, a solid electrolyte is used for the electrolyte layer. In the all-solid-state batteries, voids between particles, exfoliation of the interface between the solid electrolyte layer and the electrode active material layer, or internal cracks are likely to occur due to expansion and contraction caused by charging and discharging, and when these phenomena occur, the all-solid-state batteries do not function normally as batteries. Therefore, when analysis and evaluation are performed on this type of all-solid-state batteries as samples, it is necessary to hold the all-solid-state batteries in a pressurized state so that a conductive path is secured and expansion and contraction caused by charging and discharging are suppressed.

The components constituting the all-solid-state battery are formed of materials that react with moisture and air. Therefore, in general, a work of assembling a pressurization analysis structure is performed in an internal space of a glove box (GB) which is kept in a high-purity argon gas (inert gas) atmosphere or the like.

Further, an all-solid-state battery which has been accommodated in a hermetically sealed state inside the pressurization analysis structure is analyzed and evaluated by using an X-ray diffraction apparatus in the atmosphere. Here, it is preferable that analysis and evaluation can be performed by using a highly versatile reflection type X-ray diffraction apparatus as the X-ray diffraction apparatus.

The pressurization analysis structure according to the present embodiment described below is configured to satisfy all of these conditions described above.

First, the pressurization analysis structure according to the present embodiment will be described in detail with reference to the drawings.

Figure 2:
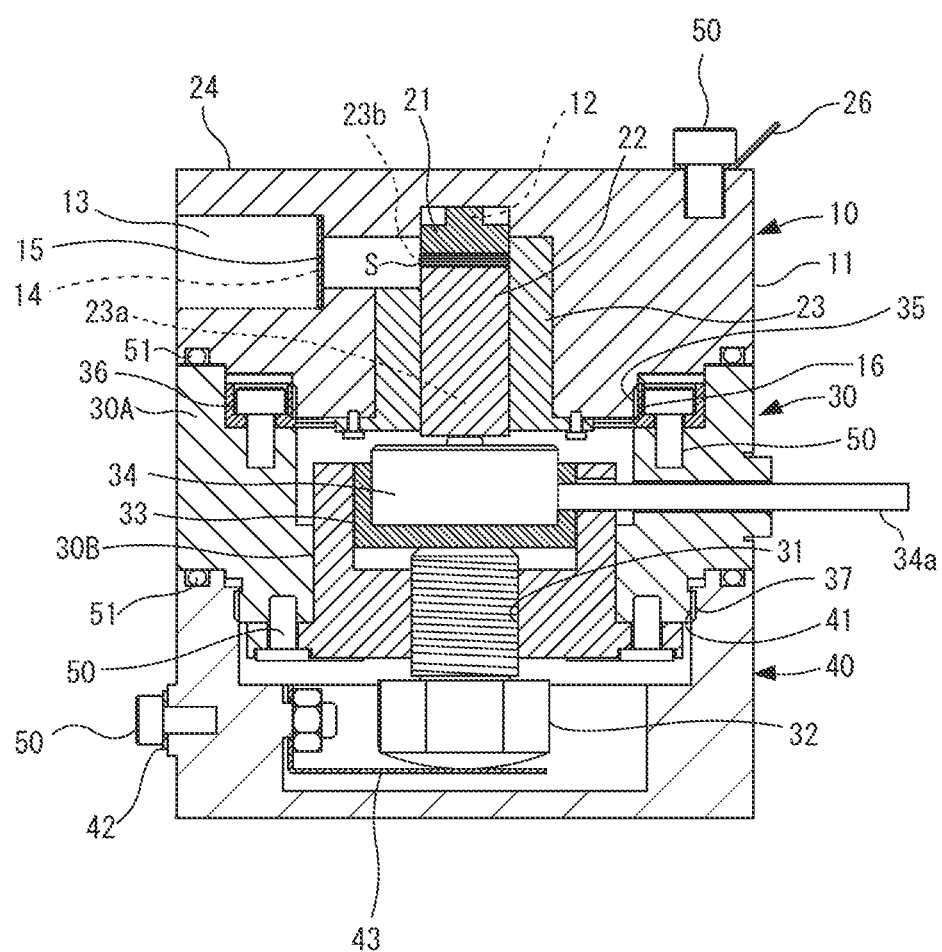
FIG. 2 is a cross-sectional view taken along a line A-A of FIG. 1, which shows an overall structure of the pressurization analysis structure according to the embodiment of the present invention.

FIG. 1 is a perspective view showing the appearance of the pressurization analysis structure according to the present embodiment, and FIG. 2 is a cross-sectional view taken along a line A-A of FIG. 1, which shows an overall structure of the pressurization analysis structure. Further, FIG. 3 is an exploded perspective view of the pressurization analysis structure according to the present embodiment, and FIG. 4 is an exploded cross-sectional view taken along the line A-A of FIG. 1.

Figure 3:
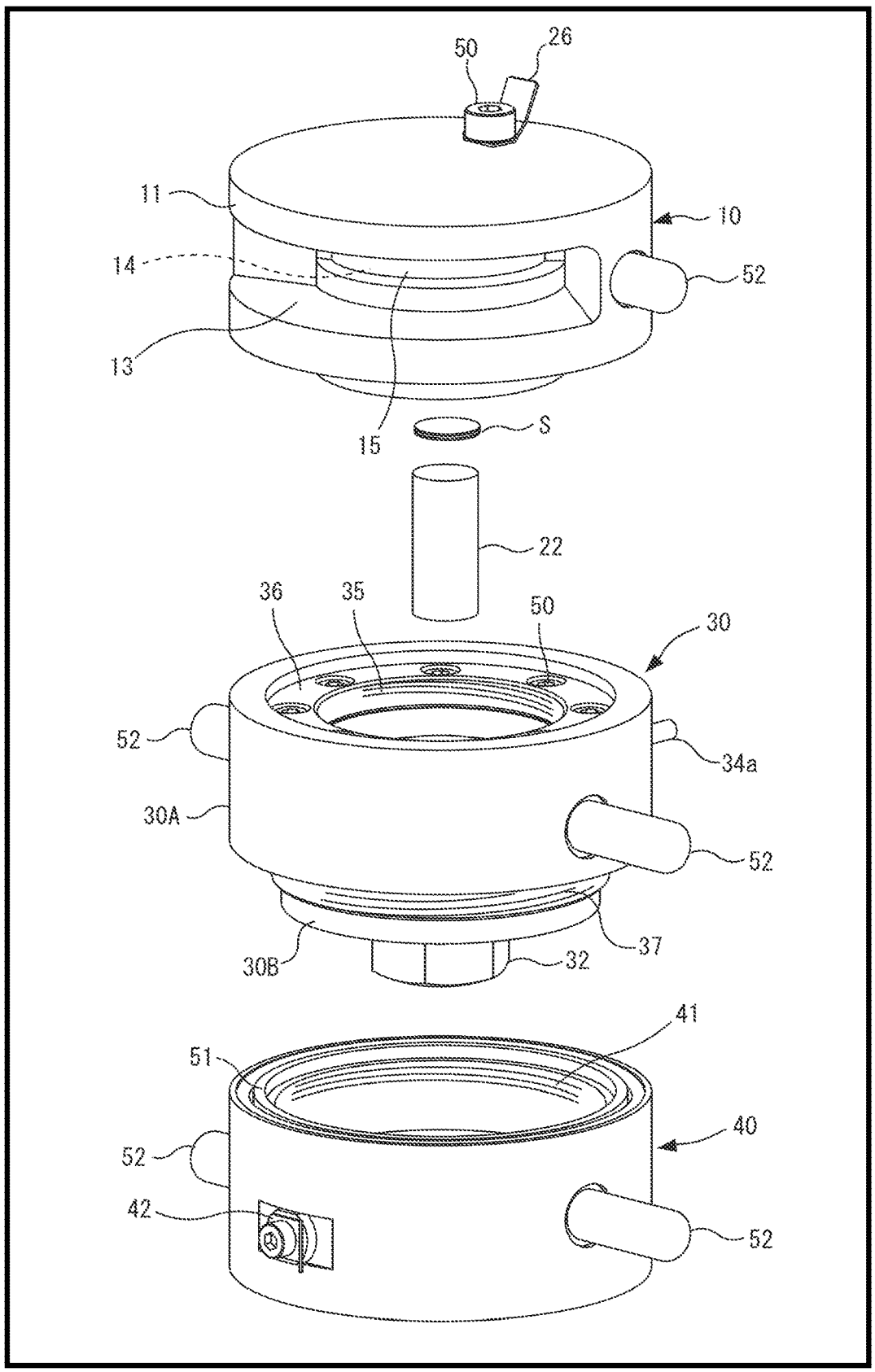
FIG. 3 is an exploded perspective view of the pressurization analysis structure according to the embodiment of the present invention.
Figure 4:
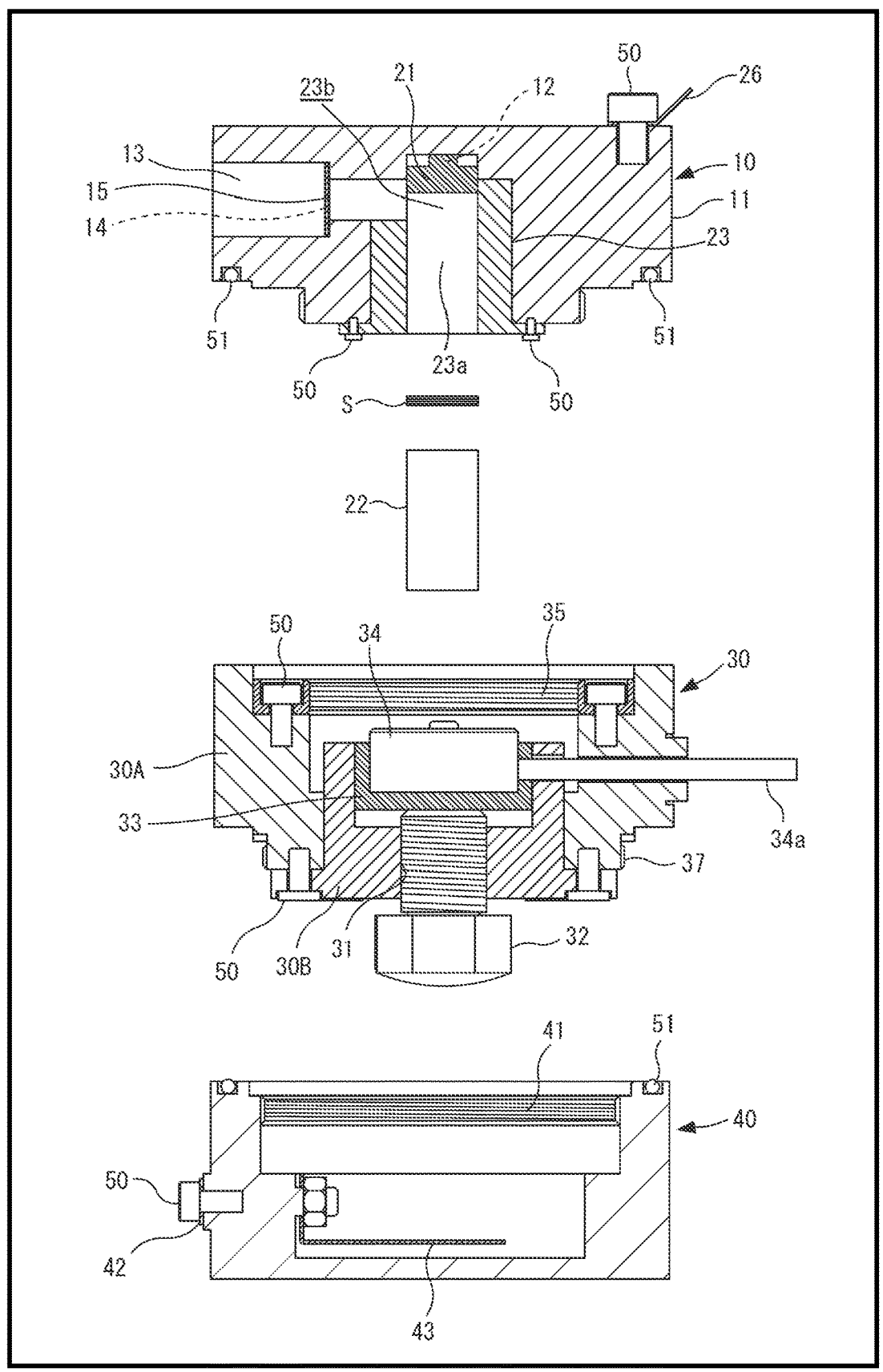
FIG. 4 is a cross-sectional view taken along the line A-A of FIG. 1, which shows the pressurization analysis structure according to the embodiment of the present invention while the structure is exploded.

As shown in FIGS. 3 and 4, the pressurization analysis structure includes respective units of a sample accommodating unit 10, a pressurizing unit 30, and an airtight case unit 40 as components. The pressurizing unit 30 is mounted on one end surface side (lower end surface side in FIGS. 3 and 4) which is opened in the sample accommodating unit 10.

An all-solid-state battery S (sample) as an analysis target is accommodated in the sample accommodating unit 10 in a hermetically sealed state to be shielded from the atmosphere.

Figure 5:
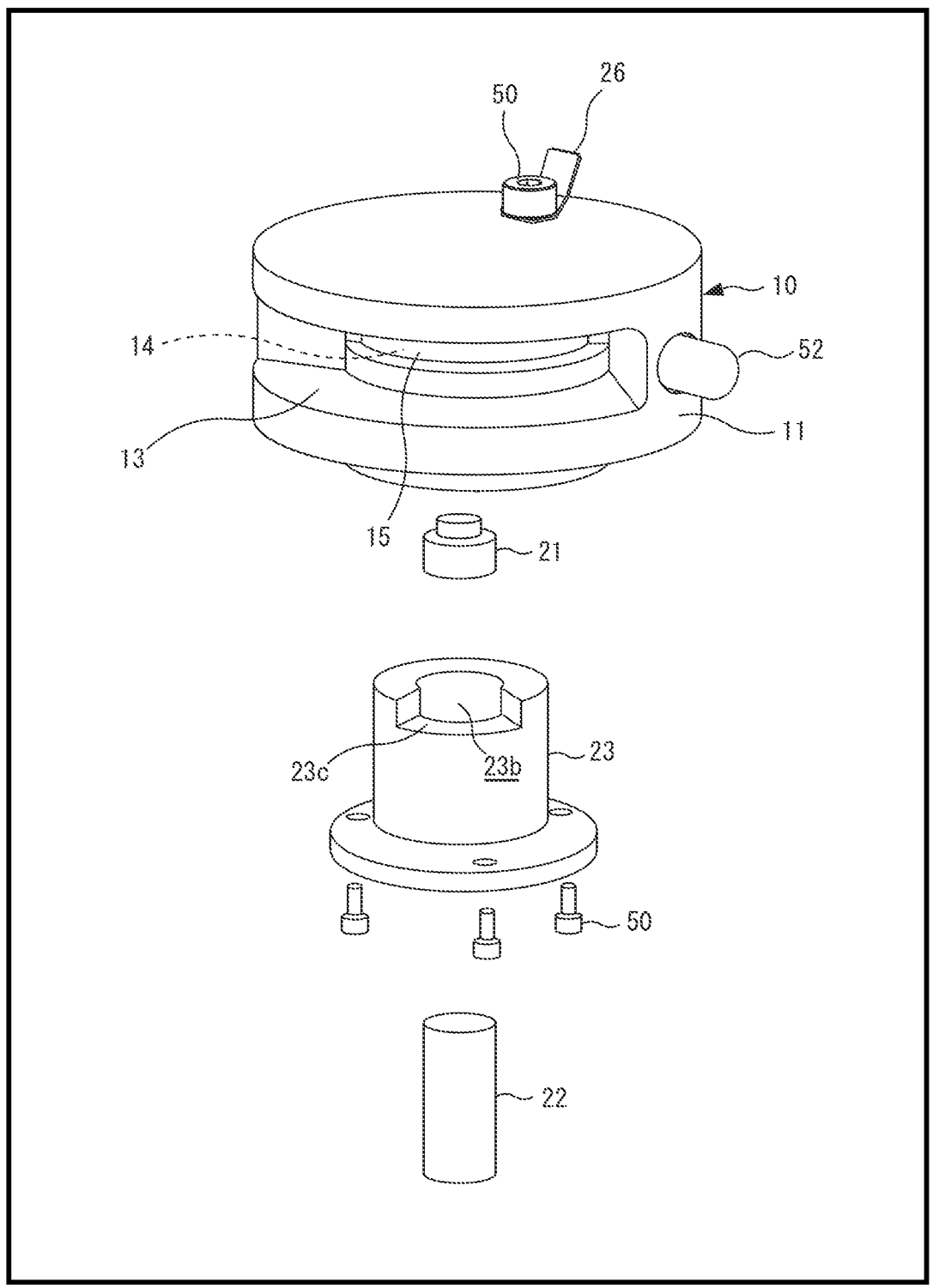
FIG. 5 is an exploded perspective view showing a configuration of a sample accommodating unit.

FIG. 5 is an exploded perspective view showing a configuration of the sample accommodating unit.

As shown in FIGS. 2 to 5, the sample accommodating unit 10 includes an accommodating unit main body 11, a pressure receiving member 21, a pressing member 22, and a sample holder 23 as components. The accommodating unit main body 11 is formed in a bottomed cylindrical shape which is opened at one end thereof and closed on the other end thereof. The inside of the accommodating unit main body 11 has a hollow portion having a circular cross-section along a central axis from the opened one end surface. This hollow portion forms a sample chamber for accommodating and placing the all-solid-state battery S therein. An inner bottom portion (that is, an inner wall portion at the other end) of the hollow portion constitutes a pressure receiving portion 12 for receiving pressure from the pressurizing unit 30 described later. The pressure receiving portion 12 is formed by a concave groove, and the pressure receiving member 21 is insertably and detachably fitted into the pressure receiving portion 12 (concave groove).

In the accommodating unit main body 11, one end surface of the pressure receiving member 21 is in contact with one end surface of the all-solid-state battery S placed in the sample chamber, and the other end surface of the pressure receiving member 21 is in contact with the pressure receiving portion 12.

The pressing member 22 has a function as pressure transmitting means for applying the pressure from the pressurizing unit 30 described later to the all-solid-state battery S. The pressing member 22 can also be treated as a component constituting the pressurization mechanism of the pressurizing unit 30 described later.

The sample holder 23 is formed in a cylindrical shape, and is mounted in the accommodating unit main body 11 by using a fastener while fitted in the hollow portion of the accommodating unit main body 11. As shown in FIG. 4, a hollow portion 23a having a circular cross-section extending along the central axis is formed inside the sample holder 23, and the inner wall of the hollow portion 23a constitutes a guide path when the all-solid-state battery S is accommodated and placed in the accommodating unit main body 11. Further, in the hollow portion 23a of the sample holder 23, a position facing an X-ray window 14 described later is a sample placing portion 23b, and the all-solid-state battery S is placed in the sample placing portion 23b.

As shown in FIG. 2, the cylindrical all-solid-state battery S is inserted into the hollow portion 23a along the inner wall of the sample holder 23, and is placed in the sample placing portion 23b while sandwiched between the pressure receiving member 21 and the pressing member 22 in the hollow portion 23a. The pressure from, the pressurizing unit 30 acts on the all-solid-state battery S via the pressing member 22. The pressure receiving member 21 receives this pressure at a position facing the pressing member 22. In other words, the all-solid-state battery S is pressurized while sandwiched between the pressure receiving member 21 and the pressing member 22. This configuration enables a large pressure to be applied to the all-solid-state battery S.

Here, the pressure receiving member 21 and the accommodating unit main body 11 that supports the pressure receiving member 21 at the inner bottom portion are formed of metal materials having hardness and rigidity that can sufficiently withstand the pressure from the pressurizing unit 30, and configured so that the all-solid-state battery S can be evenly and uniformly pressurized. Likewise, the pressing member 22 is also formed of a metal material having hardness and rigidity that can sufficiently withstand the pressure from the pressurizing unit 30.

Further, materials having electrical conductivity are selected as the metal materials forming the accommodating unit main body 11, the pressure receiving member 21, and the pressing member 22 in order to charge and discharge the all-solid-state battery S. A structure for charging and discharging the all-solid-state battery S will be described later.

On the other hand, the sample holder 23 is formed of an insulating material in order to prevent a short circuit between the components constituting the all-solid-state battery S.

Further, the pressure receiving member 21 is processed to have a stepped cylindrical shape, and one end surface thereof forms a flat pressure receiving surface that is in surface contact with one end surface of the all-solid-state battery S. Further, the pressing member 22 is processed to have a cylindrical shape, and one end surface thereof forms a flat pressing surface that is in surface contact with the other end surface of the all-solid-state battery S.

As a result, the pressure receiving member 21 and the pressing member 22 are in surface contact with both the end surfaces of the all-solid-state battery S, whereby the all-solid-state battery S can be pressurized more evenly and uniformly.

Further, the pressure receiving member 21, the pressing member 22, and the sample holder 23 are manufactured to have the outer diameter dimensions and the inner diameter dimension that match the outer diameter dimension of the all-solid-state battery S which is processed to have a cylindrical shape. By matching the inner diameter of the sample holder 23 with the outer diameter dimension of the all-solid-state battery S, the all-solid-state battery S can be placed in the sample placing portion 23b without positional displacement (without eccentricity).

When two types of all-solid-state batteries S having different outer diameter dimensions are to be analyzed, it is preferable to configure the pressure receiving member 21 so that the pressure receiving member 21 has a stepped cylindrical shape, the outer diameter dimension of one end surface thereof matches the outer diameter dimension of one type of all-solid-state battery S, and the outer diameter dimension of the other end surface thereof matches the outer diameter dimension of the other type of all-solid-state battery S. The pressure receiving portion 12 of the concave groove formed on the inner wall of the sample accommodating unit 10 is formed in a depth shallower than the total length of the pressure receiving member 21, and the pressure receiving member 21 is configured so that even when any end surface of the pressure receiving member 21 is oriented outward, the pressure receiving member 21 can be fitted in the pressure receiving portion 12 while the end surface oriented outward is exposed from the concave groove of the pressure receiving portion 12.

Further, the length dimension of the pressure receiving member 21 is adjusted in accordance with the length dimension of the all-solid-state battery S as an analysis target so that the overall all-sold-state battery S is placed in the sample placing portion 23b so as to face an X-ray window 14 described later. Regardless of which end face 21a or 21b of the pressure receiving member 21 is brought into contact with the all-solid-state battery S, the all-solid-state battery S is placed in the sample placing portion 23b.

This configuration makes it possible to place each of two types of all-solid-state batteries S having different outer diameter dimensions in the sample placing portion 23b while supporting the all-solid-state battery S with a single pressure receiving member 21 by merely changing the orientation of the pressure receiving member 21 and fitting the pressure receiving member 21 in the concave groove of the pressure receiving portion 12.

Figure 6A:
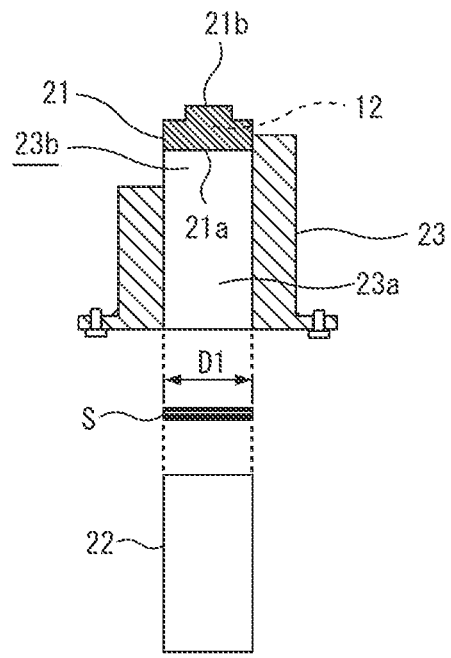
FIG. 6A and FIG. 6B are front cross-sectional views showing a configuration in which the outer diameter dimensions of a pressure receiving member and a pressing member and the inner diameter dimension of a sample holder are matched with the outer diameter dimension of an all-solid-state battery.

For example, as shown in FIG. 6A, for a first type of all-solid-battery S having a larger outer diameter dimension, the outer diameter of one end surface 21a of the pressure receiving member 21 may be processed in accordance with the outer diameter dimension D1 of the first type of all-solid-state battery S, and in addition, a pressing member 22 whose outer diameter has been processed in accordance with the outer diameter dimension D1, and a sample holder 23 having a hollow portion 23a whose inner diameter has been processed in accordance with the outer diameter dimension D1 may be prepared.

Figure 6B:
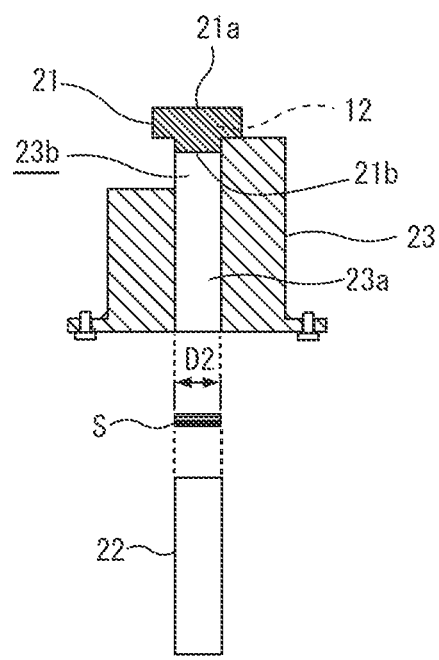

Further, as shown in FIG. 6B, for a second type of all-solid-state battery S having a smaller outer diameter dimension, the outer diameter of the other end surface 21b of the pressure receiving member 21 may be processed in accordance with the outer diameter dimension D2 of the second type of all-solid-state battery S, and in addition, a pressing member 22 whose outer diameter has been processed in accordance with the outer diameter dimension D2 and a sample holder 23 having a hollow portion 23a whose inner diameter has been processed in accordance with the outer diameter dimension D2 may be prepared.

Note that dimensional tolerance should be considered for the inner diameter dimension of the hollow portion 23a of the sample holder 23 so that the all-solid-state batteries S can be smoothly inserted.

Note that a plurality of pressure receiving members 21 having different thicknesses may be prepared, and replaced and used as appropriate according to the thicknesses of the all-solid-state batteries S and the measurement locations thereof.

As shown in FIGS. 1 to 5, the accommodating unit main body 11 is provided with the X-ray window 14 in a direction intersecting with (specifically, a radial direction orthogonal to) a direction of applying pressure to the all-solid-state battery S (the axial direction of the all-solid-state battery S). Specifically, the accommodating unit main body 11 is provided with a stepped cutout groove 13 which is formed so as to penetrate from the outer peripheral surface to the inside of the accommodating unit main body 11. The stepped cutout groove 13 is configured so that the width from a step portion thereof to the outer peripheral surface of the accommodating unit main body 11 is larger than the width from the step portion to the inside of the accommodating unit main body 11. The X-ray window 14 is provided at the step portion in the cutout groove 13.

This configuration makes it possible to shorten the distance between the all-solid-state battery S and the X-ray window 14 and efficiently detect diffracted X-rays from the all-solid-state battery S by an X-ray detector, whereby high-intensity measurement can be performed. In other words, X-rays are incident to the outer side surface (outer peripheral surface) of the all-solid-state battery S at the time of X-ray diffraction measurement. At this time, the intensity of X-rays obtained by the measurement is affected by the relation between the distance between the all-solid-state battery S and the X-ray window 14.

Figure 7A:
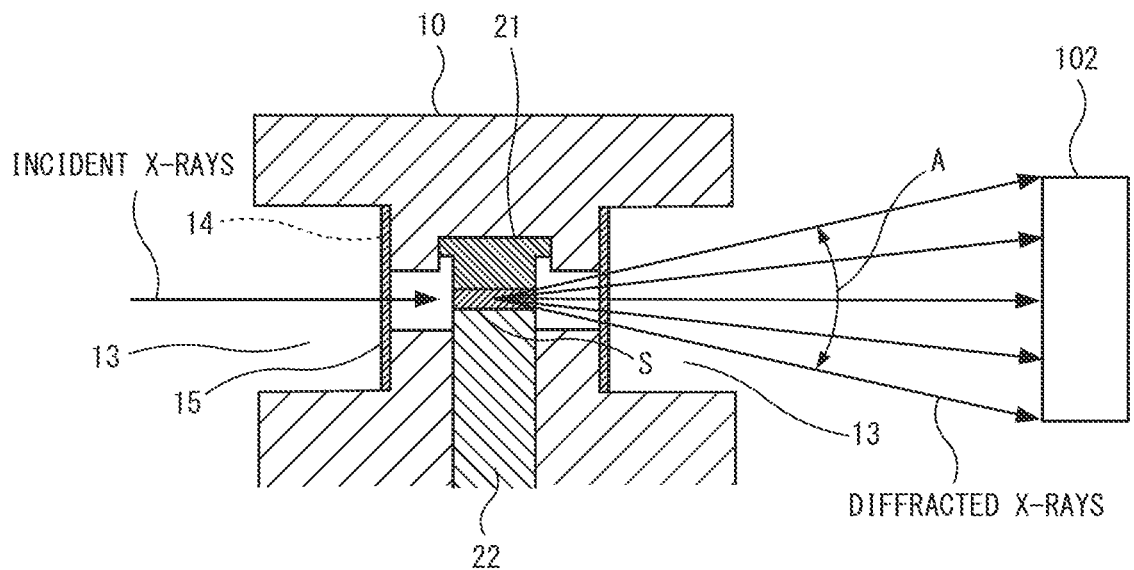
FIG. 7A is a cross-sectional view schematically showing a cutout structure around an X-ray window and an action and an effect thereof.

For example, when the distance between the outer side surface (outer peripheral surface) of the all-solid-state battery S and the X-ray window 14 is short as shown in FIG. 7A, it is possible to secure a large angle A at which diffracted X-rays reflected from a predetermined point of the all-solid-state battery S can be extracted, so that the diffracted X-rays reflected from the all-solid-state battery S can be efficiently detected by an X-ray detector 102, and high-intensity measurement can be performed.

Figure 7B:
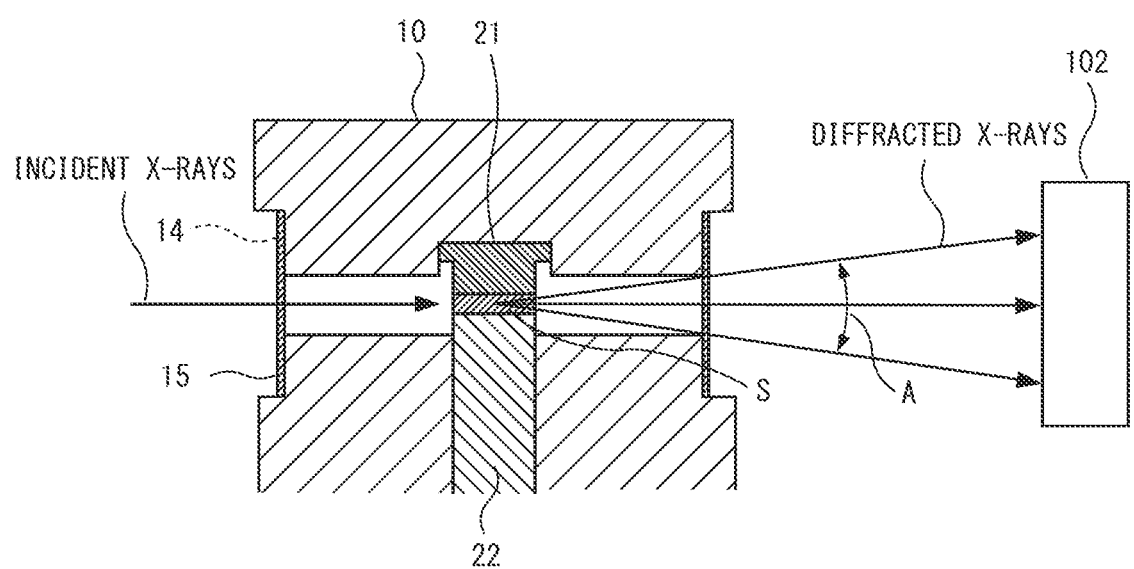
FIG. 7B is a cross-sectional view schematically showing a structure to be compared with FIG. 7A.

On the other hand, when the distance between the outer side surface (outer peripheral surface) of the all-solid-state battery S and the X-ray window 14 is long as shown in FIG. 7B, the angle A at which the diffracted X-rays reflected from the same predetermined point of the all-solid-state battery S can be extracted is smaller, so that the intensity of the diffracted X-rays incident to the X-ray detector 102 decreases.

Here, FIGS. 7A and 7B are schematic diagrams depicting a cross-section taken along a line B-B in FIG. 1, and components such as the sample holder 23 are omitted. Further, the diffracted X-rays in the figures schematically show diffracted X-rays reflected from an irradiation point of X-rays on the outer side surface (outer peripheral surface) of the all-solid-state battery S.

Further, the X-ray window 14 is provided at the step portion in the cutout groove 13 and a hermetically sealing member 15 is arranged there, thereby avoiding a trouble that an operator accidentally touches the hermetically sealing member 15 during a work, and effectively preventing the hermetically sealing member 15 from being damaged.

Still further, the surface of the step portion in the cutout groove 13 is used to attach the hermetically sealing member 15, whereby the X-ray window 14 can be easily and surely blocked, and an assembly work can be facilitated.

The sample holder 23 described above is provided with a cutout portion 23c which is formed at a location facing the cutout groove 13 (that is, the X-ray window 14) so as to extend to the hollow portion 23a as shown in FIG. 5, whereby the sample placing portion 23b set in the hollow portion 23a is caused to face the X-ray window 14 through the cutout portion 23c. As a result, the outer side surface (outer peripheral surface) of the all-solid-state battery S placed in the sample placing portion 23b can be exposed to the X-ray window 14.

Here, on the premise that the X-ray diffraction measurement is performed by the X-ray diffraction apparatus, the X-ray window 14 is formed to spread over a wide angle range so that X-rays from an X-ray source arranged outside can be taken in to irradiate the all-solid-state battery S and diffracted X-rays reflected from the all-solid-state battery S can be emitted to the X-ray detector arranged outside. As a result, reflection type X-ray diffraction measurement can be performed.

Note that the X-ray window 14 may be separated into an X-ray window for taking in X-rays from the X-ray source and irradiating the all-solid-state battery S with the X-rays, and an X-ray window for emitting diffracted X-rays reflected from the all-solid-state battery S to the X-ray detector arranged outside.

Further, the X-ray window 14 is blocked by the hermetically sealing member 15. The hermetically sealing member 15 is formed of a material (for example, beryllium) that has a high transmittance for X-rays and a small permeability for a gas such as air. The hermetically sealing member 15 makes the inside of the accommodating unit main body 11 airtight, and can prevent intrusion of air from the X-ray window 14.

Since the X-ray window 14 is provided so as to face the outer side surface (outer peripheral surface) of the all-solid-state battery S placed in the sample placing portion 23b, X-rays are irradiated in the direction to the outer side surface (outer peripheral surface) of the all-solid-state battery S. Here, the outer side surface (outer peripheral surface) of the all-solid-state battery S is an outer surface on which the lamination state of a plurality of components constituting the all-solid-state battery S can be observed. Therefore, the outer side surface on which the lamination state of the plurality of components can be observed can be irradiated with X-rays through the X-ray window 14.

Figure 8A:
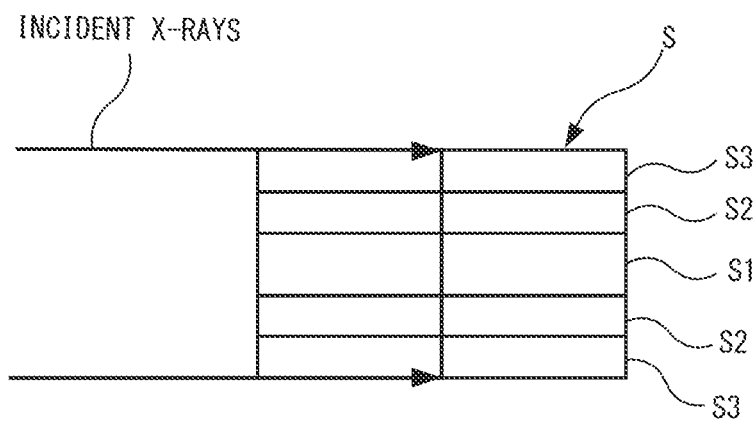
FIG. 8A and FIG. 8B are schematic diagrams showing a method of irradiating an outer surface of the all-solid-state battery with X-rays.
Figure 8B:
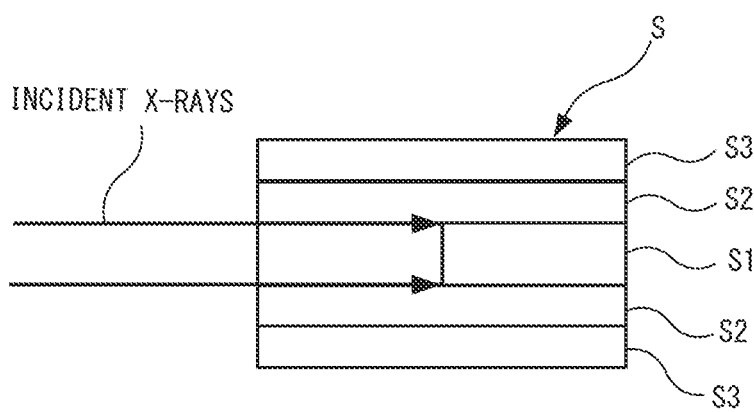

This configuration makes it possible to radiate X-rays to the outer side surface on which the plurality of components in the sample can be measured, and analyze and evaluate each of these components individually or in a lump. In other words, as shown in FIG. 8A, under an optical condition that the whole of the plurality of components (for example, an electrolyte layer S1, electrode active material layers S2, and current collector layers S3) constituting the entire all-solid-state battery S is irradiated with X-rays, it is possible to analyze and evaluate each of these components in a lump. Further, as shown in FIG. 8B, under an optical condition that only some components constituting the entire all-solid-state battery S are irradiated with X-rays, it is possible to individually analyze and evaluate the components which have been irradiated with X-rays.

Here, with respect to the relation with the X-ray window 14, it is preferable that at least the end surface of the pressure receiving member 21 described above is arranged so as to protrude to a position facing the X-ray window 14 so that the entire all-solid-state battery S (the entire body in the thickness direction) faces the X-ray window 14. Further, it is preferable to adjust the thickness dimension of the pressure receiving member 21 so that the central portion in the thickness direction of the all-solid-state battery S is arranged at a position facing the center of the X-ray window 14. By adjusting the thickness dimension of the pressure receiving member 21 as described above, the angle at which diffracted X-rays reflected from the all-solid-state battery S are extracted can be maximized.

Returning to FIGS. 2 to 4, the pressurizing unit 30 has a function of applying pressure to the all-solid-state battery S accommodated in the hollow portion of the sample accommodating unit 10 (specifically, in the hollow portion 23a of the sample holder 23).

This pressurizing unit 30 has a cylindrical body portion. The body portion includes a cylindrical outer body portion 30A and a cylindrical inner body portion 30B. The cylindrical inner body portion 30B is fitted in and fixed to (a hollow portion of) the cylindrical outer body portion 30A by fasteners 50 such as bolts, whereby the cylindrical outer body portion 30A and the cylindrical inner body portion 30B are integrated with each other (see FIG. 4).

Here, the outer body portion 30A is formed of a synthetic resin material having electrical insulation properties and having strength and airtightness capable of withstanding the reaction of pressing force (for example, polyvinyl chloride (PVC), polyvinylidene chloride (PVdC), polystyrene (PS), acrylonitrile-styrene copolymer (AS resin), acrylonitrile-butadiene-styrene copolymer (ABS resin), high-density polyethylene (HDPE), polypropylene (PP), polyacetal (POM), polymethyl methacrylate (PMMA), methacrylic aid styrene copolymer (MS), polycarbonate (PC), polychlorotrifluoroethylene (PCTFE), polytetrafluoroethylene (PTFE) or the like). Further, the inner body portion 30B is formed of a metal material having the strength capable of withstanding the reaction of pressing force.

The inner peripheral surface of the inner body portion 30B is formed in a stepped shape as shown in FIG. 4, and a nut portion 31 is formed on the inner peripheral surface of a rear portion having a small inner diameter. One bolt member 32 is screwed into the nut portion 31. The bolt member 32 constitutes a pressurizing mechanism for applying pressure to the all-solid-state battery S accommodated in the hollow portion of the sample accommodating unit 10. Further, the bolt member 32 forms a conductive path for charging and discharging the all-solid-state battery S as described later. Therefore, the bolt member 32 is formed of a metal material having strength for pressurizing a high pressure to the all-solid-state battery S and having electrical conductivity.

A pressure transmission member 33 is freely slidably fitted on the inner peripheral surface of a front portion having a large inner diameter in the inner body portion 30B, and a load cell 34 as pressure measuring means is incorporated in the pressure transmission member 33. The load cell 34 measures the pressure generated by screwing the bolt member 32, and outputs an electric signal indicating the measured value to a pressure indicator (not shown) via an output rod 34a (output unit). By measuring the pressure as described above, it is possible to analyze and evaluate the correlation between the pressure acting on the all-solid-state battery S and the change in crystal structure caused by the charging and discharging of the all-solid-state battery S.

The pressure transmission member 33 and the load cell 34 also form a conductive path for charging and discharging the all-solid-state battery S as described later. Therefore, they are formed of metal materials having electrical conductivity.

Note that the pressure measuring means is not limited to the load cell, and for example, a torque wrench can be used instead of the load cell to obtain the pressure from the torque acting on the bolt member 32.

As shown in FIG. 2, the pressurizing unit 30 is mounted on one end surface side (lower end surface side in FIG. 2) of the sample accommodating unit 10. The pressing member 22 formed in a cylindrical shape is inserted into the hollow portion of the sample accommodating unit 10 (specifically, the hollow portion 23a of the sample holder 23).

The pressing member 22 is interposed between the load cell 34 and the all-solid-state battery S, and has a function of pressing the all-solid-state battery S in the direction to the pressure receiving member 21 with the pressing force from the bolt member 32. In other words, as the bolt member 32 is screwed in, the pressing force acts on the all-solid-state battery S via the pressure transmission member 33, the load cell 34, and the pressing member 22, so that the all-solid-state battery S is pressed against the pressure receiving member 21.

As a result, the all-solid-state battery S can be pressurized. The pressurization value can be arbitrarily set by adjusting the screwing amount of the bolt member 32 while checking the display of the pressure indicator (not shown).

Here, the pressing member 22 also forms a conductive path for charging and discharging the all-solid-state battery S as described later. Therefore, as described above, it is formed of a metal material having electrical conductivity.

As shown in FIGS. 2 to 4, the airtight case unit 40 is formed in a bottomed cylindrical shape, and one end surface side (upper end surface side in the figures) thereof which is opened is mounted on the other end surface side (lower end surface side in the figures) of the pressurizing unit 30. As described above, the airtight case unit 40 is mounted on the other end surface side of the pressurizing unit 30, whereby the periphery of the other end surface side is hermetically sealed by the airtight case unit 40, and shielded from the atmosphere.

The head portion of the bolt member 32 provided in the pressurizing unit 30 is exposed on the other end surface side of the pressurizing unit 30, and is placed in the hollow portion of the airtight case unit 40. The hollow portion of the airtight case unit 40 is a hermetically sealed space, so that air can be prevented from infiltrating into the sample accommodating unit 10 through a slight gap at an engaging portion between the bolt member 32 and the nut portion 31.

The airtight case unit 40 is formed of a synthetic resin material having electrical insulation properties (for example, polyvinyl chloride (PVC), polyvinylidene chloride (PVdC), polystyrene (PS), acrylonitrile-styrene copolymer (AS resin), acrylonitrile-butadiene-styrene copolymer (ABS resin), high-density polyethylene (HDPE), polypropylene (PP), polyacetal (POM), polymethyl methacrylate (PMMA), methacrylic aid styrene copolymer (MS), polycarbonate (PC), polychlorotrifluoroethylene (PCTFE), polytetrafluoroethylene (PTFE) or the like).

A male screw portion 16 is provided on the opened one end surface side (lower end surface side in the figures) of the sample accommodating unit 10 described above, and a female screw portion 35 is provide on one end surface side (upper end surface side in the figures) of the pressurizing unit 30 to be mounted on the opened one end surface side of the sample accommodating unit 10. The male screw portion 16 and the female screw portion 35 are screwed together (that is, a screwing operation is performed), so that the one end surface side of the pressurizing unit 30 is mounted on the one end surface side of the sample accommodating unit 10.

Further, a second male screw portion 37 is provided on the other end surface side (lower end surface side in the figures) of the pressurizing unit 30 described above, and a second female screw portion 41 is provided on one end surface side (upper end surface side in the figures) of the airtight case unit 40 to be mounted on the other end surface side of the pressurizing unit 30. The second male screw portion 37 and the second female screw portion 41 are screwed together (that is, the screwing operation is performed), so that the one end surface side of the airtight case unit 40 is mounted on the other end surface side of the pressurizing unit 30.

As described above, by a simple work of merely screwing a pair of male and female screw portions together (that is, performing the screwing operation), it is possible to mount the pressurizing unit 30 on the sample accommodating unit 10 and hermetically seal the gap between the pressurizing unit 30 and the sample accommodating unit 10 in which the all-solid-state battery S is accommodated. Likewise, by a simple work of merely screwing a pair of male and female screw portions together (that is, performing the screwing operation), it is possible to mount the airtight case unit 40 on the pressurizing unit 30 and hermetically seal the periphery of the other end surface side of the pressurizing unit 30 to which the bolt member 32 (pressurizing mechanism) is exposed.

Therefore, a worker can easily perform an assembly work even when the assembling work must be performed via a glove from the outside of a glove box.

No special tool is required for these screwing operations. For example, it is possible to easily perform the screwing operation on units to be screwed together by fixing one of the units and screwing the other unit manually while grasping the other unit.

In the present embodiment, as shown in FIG. 3, an operating rod 52 for the screwing operation is provided on the outer peripheral surface of each of the sample accommodating unit 10, the pressurizing unit 30, and the airtight case unit 40. Particularly, two operating rods 52 are provided on each of the units 10, 30 and 40 so as to be arranged away from each other at an angular interval of 180° and protrude outward in the radial direction. The worker can more easily perform each of the screwing operations described above by merely turning the operating rods 52 by hand.

Since the male screw portion 16 is formed in the metal sample accommodating unit 10, the female screw portion 35 to be threaded with the male screw portion 16 is also formed on the inner peripheral surface of a metal ring 36 as shown in FIG. 3, and the metal ring 36 is attached to the outer body portion 30A of the pressurizing unit 30 formed of synthetic resin by a fastener 50 such as a bolt. As a result, the female screw portion 35 can be provided with wear resistance and strength having the same level as the male screw portion 16.

An O-ring 51 is provided on the one end surface of the sample accommodating unit 10 to be in close contact with the one end surface side of the pressurizing unit 30. Further, an O-ring 51 as the hermetically sealing member 15 is also provided on the one end surface of the airtight case unit 40 to be in close contact with the other end surface side of the pressurizing unit 30. By interposing these O-rings 51, it is possible to easily hermetically seal the gaps between the respective units by merely performing a manual screwing operation.

Returning to FIG. 1, the pressurization analysis structure of the present embodiment includes a first electrode terminal 26 and a second electrode terminal 42 on the outside thereof.

The first electrode terminal 26 is fixed to the outer surface of the accommodating unit main body 11 by a fastener 50 such as a bolt. As described above, the accommodating unit main body 11 and the pressure receiving member 21 are formed of metal materials having electrical conductivity. Therefore, as shown in FIG. 2, the first electrode terminal 26 is set to a state where it is in electrical communication with one of the current collector layers of the all-solid-state battery S via the accommodating unit main body 11 and the pressure receiving member 21.

The second electrode terminal 42 is fixed to the outer peripheral surface of the airtight case unit 40 by a fastener 50 such as a bolt. A conductive member 43 that electrically conducts with the second electrode terminal 42 is arranged inside the airtight case unit 40. The conductive member 43 is formed of a metal plate having a spring property, and positioned so that the head portion of the bolt member 32 abuts against the conductive member 43 when the airtight case unit 40 is mounted on the pressurizing unit 30.

Therefore, as shown in FIG. 2, the second electrode terminal 42 is set to a state where it is in electrical communication with the other electrode active material layer of the all-solid-state battery S through a conductive path formed by the conductive member 43, the bolt member 32 (or the inner body portion 30B), the pressure transmission member 33, the load cell 34, and the pressing member 22.

Therefore, the all-solid-state battery S accommodated in the sample accommodating unit 10 can be charged by causing current to flow between the first electrode terminal 26 and the second electrode terminal 42, and further the all-solid-state battery S can be discharged by conducting these electrode terminals with a resistor interposed therebetween.

As shown in FIG. 2, the first electrode terminal 26 and the second electrode terminal 42 are insulated from each other by the outer body portion 30A formed of synthetic resin in the pressurizing unit 30 and the airtight case unit 40 which is also formed of synthetic resin.

Next, an X-ray diffraction apparatus according to an embodiment of the present invention will be described.

Figure 10A:
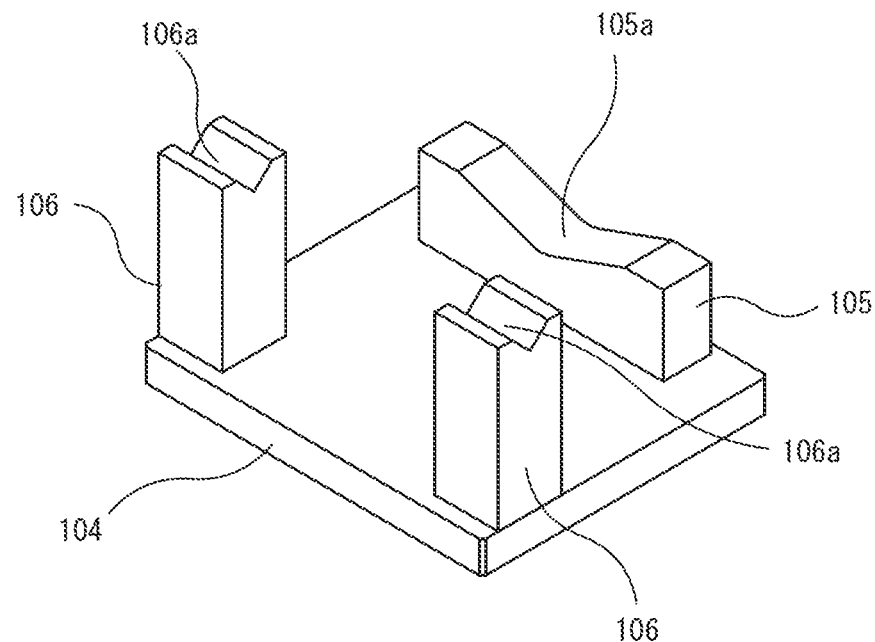
FIG. 10A is a perspective view showing a support stand provided on a sample stage of the X-ray diffraction apparatus according to the embodiment of the present invention.
Figure 10B:
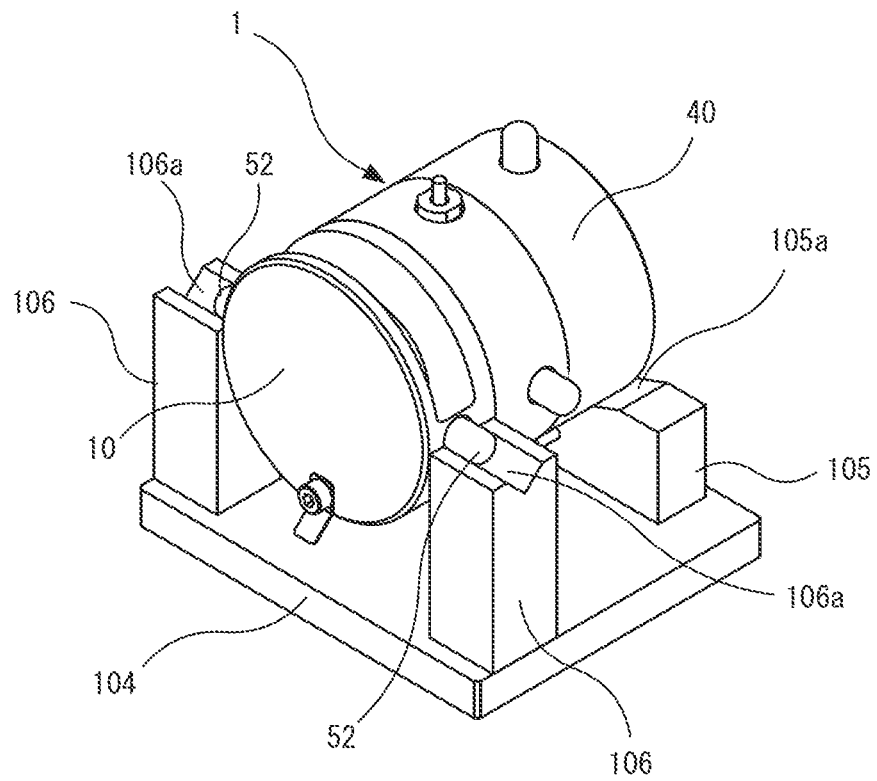
FIG. 10B is a perspective view showing a state in which the pressurization analysis structure is supported by the support stand.

FIG. 9 is a perspective view showing the appearance of the X-ray diffraction apparatus according to the present embodiment, and FIGS. 10A and 10B are perspective views showing a configuration of a sample stage provided in the X-ray diffraction apparatus.

The X-ray diffraction apparatus is an apparatus for analyzing a sample (all-solid-state battery S) by detecting diffracted X-rays reflected at a predetermined angle from a sample (all-solid-state battery S) according to a crystal structure of the sample with the X-ray detector 102 when the surface of the sample is irradiated with X-rays emitted from the X-ray source 101. Since the basic structure of the X-ray diffraction apparatus as described above has been already well known, detailed description thereof is omitted.

As shown in FIG. 9, in addition to the X-ray source 101 and the X-ray detector 102, the X-ray diffraction apparatus according to the present embodiment includes, as components, the pressurization analysis structure 1 having the above-described configuration and a sample stage 103 on which the pressurization analysis structure 1 is arranged.

A support stand 104 on which the outer surface of the pressurization analysis structure 1 is arranged is fixed to the sample stage 103. As shown in FIG. 10A, the support stand 104 includes a support leg 105 (first support portion) having a V-shaped (or arc-shaped) support groove 105a formed therein, and a pair of left and right support legs 106 (second support portions) in which support grooves 106a are formed, respectively. These support legs 105 and 106 form a support portion for supporting the pressurization analysis structure 1.

Further, the pair of operating rods 52 provided in the sample accommodating unit 10 function as supported portions placed on the pair of support grooves 106a. As shown in FIG. 10B, a rear end portion of the pressurization analysis structure 1 (the portion corresponding to the airtight case unit 40) is placed on the support groove 105a, and the two operating rods 52 of the sample accommodating unit 10 in which the X-ray window 14 is formed are placed on the support grooves 106a respectively, whereby the central axis of the all-solid-state battery S accommodated and supported in the sample accommodating unit 10 is arranged horizontally. Further, the pair of operating rods 52 provided in the sample accommodating unit 10 are supported by the pair of support grooves 106a, whereby an axis orthogonal to the central axis of all solid-state battery S accommodated and supported in the sample accommodating unit 10 is arranged horizontally. A virtual plane including the central axis of the all-solid-state battery S and the axis orthogonal to the central axis serves as a measurement reference plane, and X-ray diffraction measurement is continued while keeping the relation of θ-2θ with the horizontally-arranged measurement reference plane.

The sample stage 103 is equipped with a movement adjusting mechanism 107 for moving the support stand 104 in two directions (X-direction and Y-direction) on the horizontal plane and a height direction (Z-direction). The all-solid-state battery S in the pressurization analysis structure 1 is positioned at an irradiation position of X-rays from the X-ray source 101 by the movement adjusting mechanism 107.

The X-ray window 14 of the pressurization analysis structure 1 is arranged to face upward above the support stand 104, and X-rays from the X-ray source 101 are applied to the all-solid-state battery S through the X-ray window 14. Diffracted X-rays reflected from the all-solid-state battery S are detected by the X-ray detector 102 through the X-ray window 14.

Next, a pressurization analysis system according to an embodiment of the present invention will be described.

Figure 11:
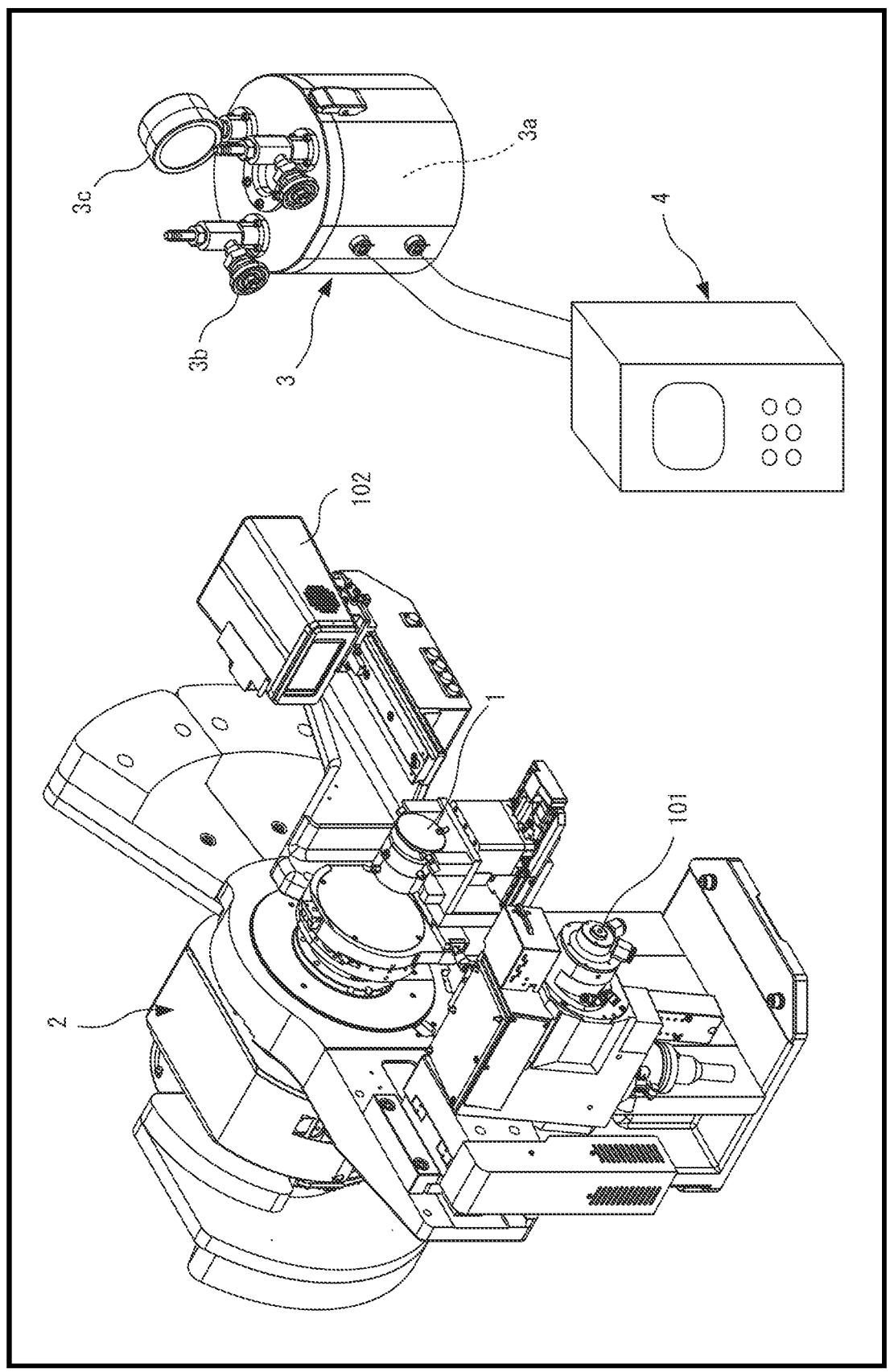
FIG. 11 is a configuration diagram schematically showing an overall structure of a pressurization analysis system according to the embodiment of the present invention.

FIG. 11 is a configuration diagram schematically showing the overall structure of the pressurization analysis system according to the present embodiment.

The pressurization analysis system includes, as components, the above-mentioned X-ray diffraction apparatus 2, an airtight device 3 for shielding the pressurization analysis structure 1 from the atmosphere for a long period of time while accommodating the pressurization analysis structure 1 therein, and a measuring device 4 for measuring the pressure and electrochemical characteristics of an all-solid-state battery S (sample) accommodated in the pressurization analysis structure 1 at the outside of the airtight device 3.

The airtight device 3 has an internal space 3a that can accommodate the pressurization analysis structure 1. The internal space 3a forms a hermetically sealed space that blocks the atmosphere. The internal space 3a is configured to communicate with a vacuum pump (not shown) via a pipe 3b, and be evacuated by the operation of the vacuum pump. A vacuum gauge 3c is incorporated in the airtight device 3, and the degree of vacuum in the internal space 3a is constantly measured by the pressure gauge 3c.

Note that the airtight device 3 may have a function of keeping a vacuum level at which the all-solid-state battery S placed in the pressurization analysis structure 1 can be shielded from the atmosphere or filling a high-purity argon gas (inert gas) at least while the measurement is continued.

The measuring device 4 has a function of inputting a signal from the load cell 34 included in the pressurization analysis structure 1 to measure the pressurized state of the all-solid-state battery S. Further, the measuring device 4 is connected to the first electrode terminal 26 and the second electrode terminal 42 to be brought with a function of measuring a state in which the all-solid-state battery S is charged and discharged. Further, the measuring device 4 is connected to a temperature sensor 202 described later to be brought with a function of measuring the temperature of the all-solid-state battery S.

The pressurization analysis structure 1 is accommodated in the internal space 3a of the airtight device 3, and the pressure and electrochemical characteristics of the all-solid-state battery S are measured by the measuring device 4. When a change appears in the measured value, the pressurization analysis structure 1 is taken out from the airtight device 3, and placed on the sample stage 103 of the X-ray diffraction apparatus 2 to perform X-ray diffraction measurement. By analyzing the all-solid-state battery S according to the procedure as described above, it is not necessary to occupy the X-ray diffraction apparatus 2 for a long time, and it is possible to efficiently proceed with the analysis and evaluation.

Next, another embodiment of the pressurization analysis structure according to the present invention will be described.

Figure 12A:
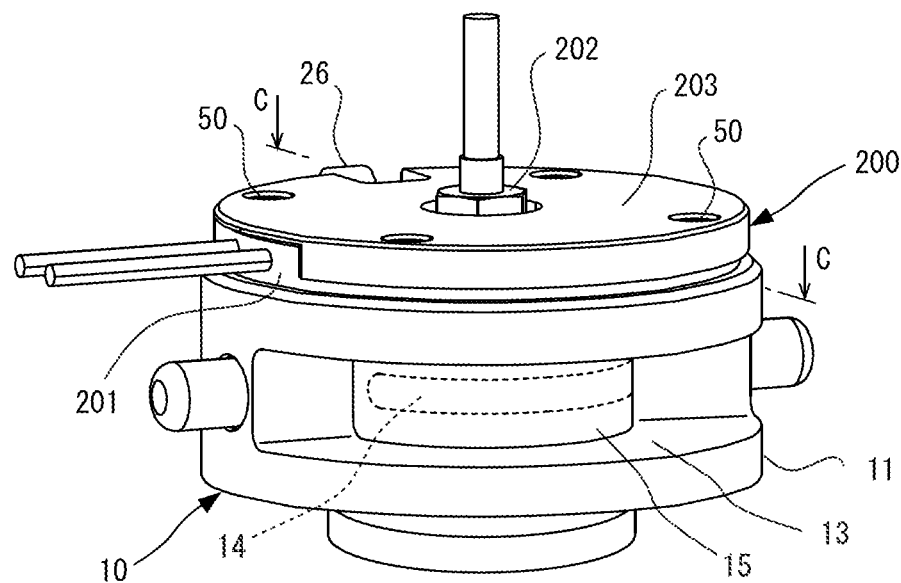
FIG. 12A is a perspective view showing the appearance of the sample accommodating unit in which a temperature adjusting/measuring cell is installed.
Figure 12B:
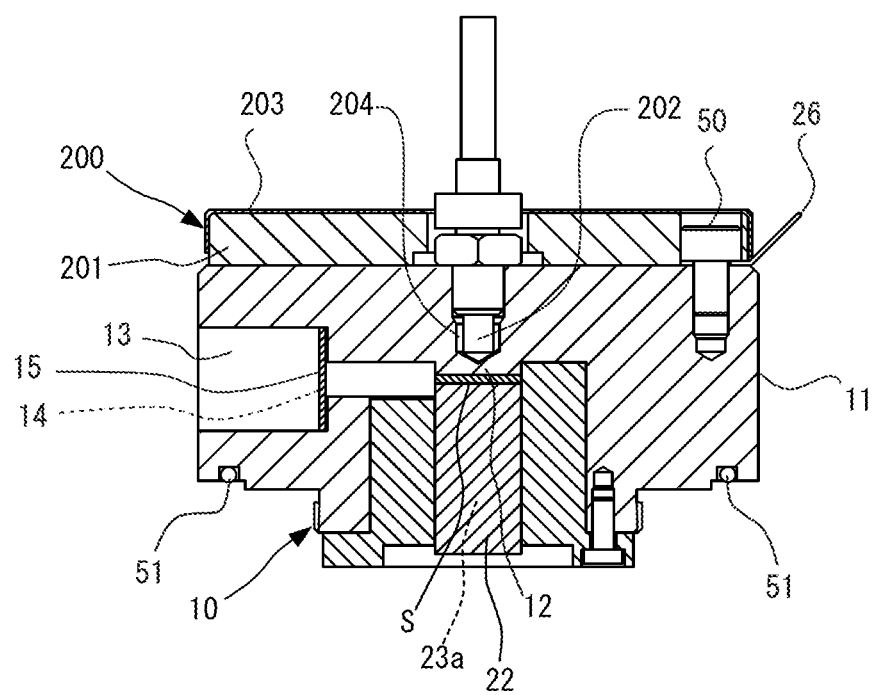
FIG. 12B is a cross-sectional view taken along a line C-C of FIG. 12A.

FIGS. 12A and 12B are diagrams showing a configuration of a sample accommodating unit in which a temperature adjusting/measuring cell is installed. As shown in these figures, a temperature adjusting/measuring cell 200 may be installed in the sample accommodating unit 10. The temperature adjusting/measuring cell 200 includes a heater 201 and a temperature sensor 202. The heater 201 functions as a temperature adjusting member for adjusting the temperature of the all-solid-state battery S accommodated in the sample accommodating unit 10, and the temperature sensor 202 functions as a temperature measuring member for measuring the temperature of the all-solid-state battery S.

As described above, the pressurization analysis structure is configured to include the temperature adjusting member and the temperature measuring member, whereby it is possible to analyze and evaluate a sample under appropriate pressure and temperature conditions.

The heater 201 is arranged so as to be superimposed on an end surface of the accommodating unit main body 11 which is exposed to the outside, the surface of the heater 201 is covered with a pressing member 203 formed of a heat insulating material, and the heater 201 is fixed to the accommodating unit main body 11 by a fastener 50 such as a bolt.

Further, the temperature sensor 202 is embedded in a screw groove 204 which is provided in the central portion of the accommodating unit main body 11 so as to extend in an axial direction, and the tip thereof is arranged in the vicinity of the pressure receiving portion 12. In FIG. 12B, the pressure receiving member is not used, and the pressure receiving portion 12 is protruded to the hollow portion 23a side to bring the all-solid-state battery S into contact with the pressure receiving portion 12. However, as in the case of the previous embodiment, the pressure receiving member 21 may be interposed.

The heat from the heater 201 is transferred to one end surface of the all-solid-state battery S via the pressure receiving portion 12 of the accommodating unit main body 11. With respect to the all-solid-state battery S and the like which have low ionic conductivity at room temperature, a conductive path may not be secured only by pressurizing them. In that case, by heating the all-solid-state battery S with the heater 201, it is possible to secure a conductive path for charging and discharging. The temperature of the all-solid-state battery S is measured by the temperature sensor 202, and the heater 201 is controlled based on the measured value by a temperature control device (not shown) to adjust the all-solid-state battery S to a desired temperature.

The present invention is not limited to the above-described embodiments, and it goes without saying that various modifications and applications can be implemented.

For example, the pressurization analysis structure of the present invention can be applied to analysis and evaluation on various types of batteries using a solid or gel-like electrolyte as the electrolyte. Furthermore, as described above, it can be applied to analysis and evaluation on various samples under a pressurized state.

Further, the shape of each of the components constituting the pressurization analysis structure of the present invention is not limited to the shape shown in the above-described embodiments. For example, the shape of the sample accommodating unit 10 is not limited to a bottomed cylindrical shape, the shape of the pressurizing unit 30 is not limited to a cylindrical shape, and the shape of the airtight case unit 40 is not limited to a bottomed cylindrical shape, and the components may be manufactured to have other shapes as necessary.

Further, the pressure receiving member 21 is provided in the above-described embodiments. However, these embodiments may be configured so that the pressure receiving member 21 is omitted, the pressure receiving portion 12 of the accommodating unit main body 11 is formed in a convex shape, and the all-solid-state battery S is supported by the pressure receiving portion 12. Another embodiment shown in FIG. 12B has a configuration in which the pressure receiving member 21 is omitted.

Further, a glove box is not indispensable for assembling the pressurization analysis structure according to the present invention, and it is possible to perform an assembling work using no glove box according to the types of all-solid-state batteries.

The sample accommodating unit, the pressurizing unit, the airtight case unit, and the components thereof are not limited to the configurations of the above-described embodiments. For example, which part of each component is formed of a conductive material or insulating material can be changed in design as appropriate according to the installation location of each electrode terminal and the like.

The invention claimed is:

1. A structure for pressurization analysis comprising:
a sample accommodating unit in which a sample chamber for accommodating and placing a sample therein is formed; and
a pressurizing unit that is mounted on the sample accommodating unit and includes a pressurizing mechanism for causing pressure to act on the sample in the sample chamber,
wherein the sample accommodating unit includes a pressure receiving portion for receiving pressure from the pressurizing unit at a position opposite to the pressurizing unit with respect to the sample in the sample chamber, and an X-ray window provided in a direction intersecting an acting direction of the pressure from the pressurizing unit, and is configured to receive X-rays through the X-ray window to irradiate the sample in the sample chamber with the X-rays, and emit diffracted X-rays reflected from the sample to an outside of the sample accommodating unit from the X-ray window, and
wherein the X-ray window is blocked by a hermetically sealing member formed of a material through which X-rays are transmitted.

2. The structure for pressurization analysis according to claim 1, wherein the sample accommodating unit includes a bottomed cylindrical accommodating unit main body having one end surface which is opened, the sample chamber is formed inside the accommodating unit main body, and the pressure receiving portion receives the pressure of the pressurizing unit in a direction from an opened one end surface side of the accommodating unit main body to the sample in the sample chamber, and is formed at an inner bottom portion opposite to the opened one end surface, and
wherein the X-ray window is provided to face an outer peripheral surface of the accommodating unit main body.

3. The structure for pressurization analysis according to claim 2, wherein a stepped cutout groove is formed so as to penetrate from the outer peripheral surface of the accommodating unit main body to an inside of the accommodating unit main body, the stepped cutout groove is configured so that an opening width of a space extending from a step portion of the cutout groove to the outer peripheral surface is larger than an opening width of a space extending from the step portion to the inside, and the X-ray window is provided at the step portion.

4. The structure for pressurization analysis according to claim 1, wherein the sample accommodating unit includes a temperature adjusting member for adjusting the temperature of the sample placed in the sample chamber, and a temperature measuring member for measuring the temperature of the sample.

5. The structure for pressurization analysis according to claim 1, wherein a sample including a plurality of laminated components is applied as an analysis target, and the structure for pressurization analysis further comprises a sample holder to be fitted and mounted in the sample accommodating unit, and wherein the sample holder accommodates the sample therein, and is provided with a cutout portion through which an outer peripheral surface of the sample for enabling observation of a lamination state of the plurality of components of the sample is exposed to the X-ray window.

6. The structure for pressurization analysis according to claim 5, further comprising a pressure receiving member that is provided in the sample chamber and configured so that one end surface thereof is in contact with one end surface of the sample placed in the sample chamber, and the other end surface thereof is in contact with the pressure receiving portion.

7. The structure for pressurization analysis according to claim 5, wherein the sample is an all-solid-state battery including an electrolyte layer, electrode active material layers arranged at both end sides of the electrolyte layer, and current collector layers arranged outside the electrode active material layers respectively, and the structure for pressurization analysis further comprises a first electrode terminal in electrical communication with one of the current collector layers, and a second electrode terminal in electrical communication with the other current collector layer.

8. The structure for pressurization analysis according to claim 7, wherein the first electrode terminal is provided outside the sample accommodating unit, the sample accommodating unit includes a component having electrical conductivity, and the one current collector layer and the first electrode terminal are in electrical communication with each other via the component having electrical conductivity.

9. The structure for pressurization analysis according to claim 7, wherein the pressurizing mechanism is formed of a metal member having electrical conductivity, and the other current collector layer and the second electrode terminal are in electrical communication with each other via the pressurizing mechanism.

10. An X-ray diffraction apparatus comprising:
the structure for pressurization analysis according to claim 1;
a sample stage for arranging the structure for pressurization analysis thereon;
an X-ray source for applying X-rays to a sample in the sample chamber; and
an X-ray detector for detecting diffracted X-rays reflected from the sample, wherein the sample stage includes a support portion for supporting the structure for pressurization analysis so that a measurement reference plane including a central axis of the sample in the sample chamber and an axis orthogonal to the central axis is arranged horizontally, and a movement adjusting mechanism for positioning the sample in the sample chamber to an X-ray irradiation position of X-rays from the X-ray source in a state where the measurement reference plane is arranged horizontally.

11. The X-ray diffraction apparatus according to claim 10, wherein the support portion includes a first support portion for supporting an airtight case unit mounted on an end surface side of the pressurizing unit to hermetically seal the periphery of the end surface side of the pressurizing unit and a second support portion for supporting the sample accommodating unit, and is configured so that the central axis of the sample in the sample chamber is arranged horizontally by the first and second support portions, and the axis orthogonal to the central axis of the sample is arranged horizontally by the second support portion.

12. A pressurization analysis system comprising:
the X-ray diffraction apparatus according to claim 10;
an airtight device for accommodating the structure for pressurization analysis therein to shield the structure for pressurization analysis from an atmosphere; and
a measuring device for measuring pressure and electrochemical characteristics of the sample accommodated in the structure for pressurization analysis outside the airtight device.

* * * * *